March 11, 1924.
B. R. ROBLIN
1,486,456
VEHICLE WHEEL
Filed March 25, 1921   2 Sheets-Sheet 1
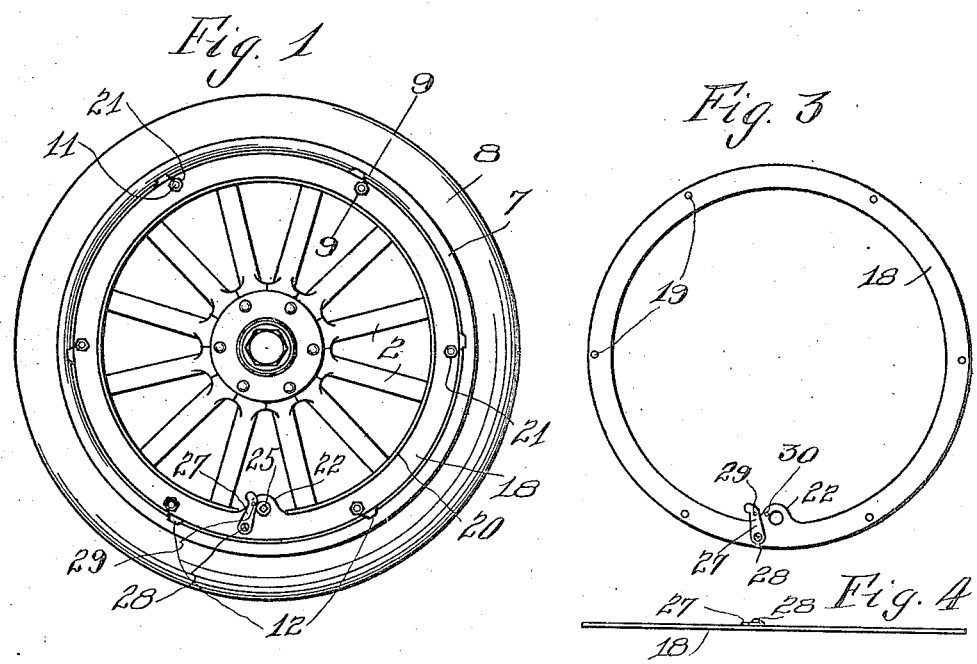
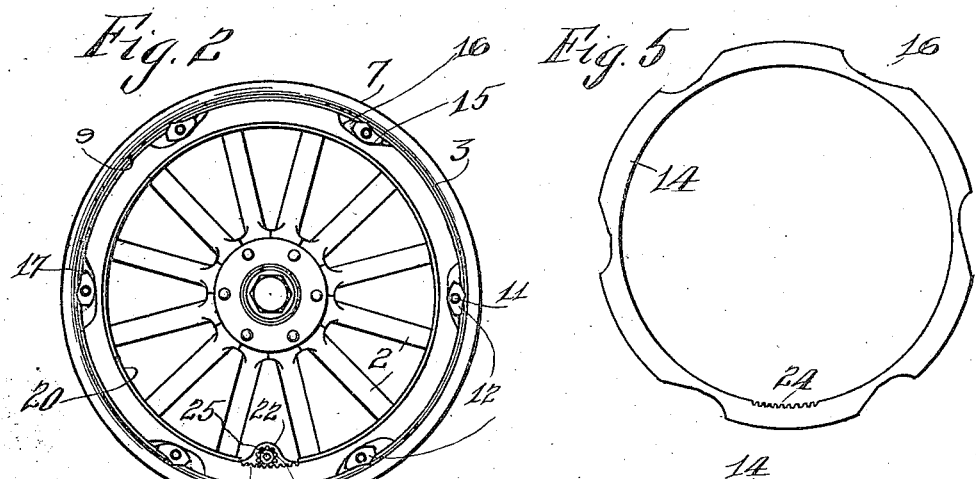
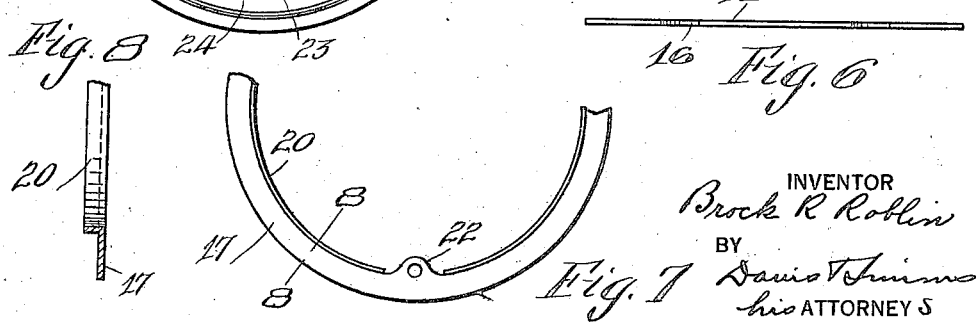
INVENTOR
Brock R. Roblin
BY
Davis & Simms
his ATTORNEYS

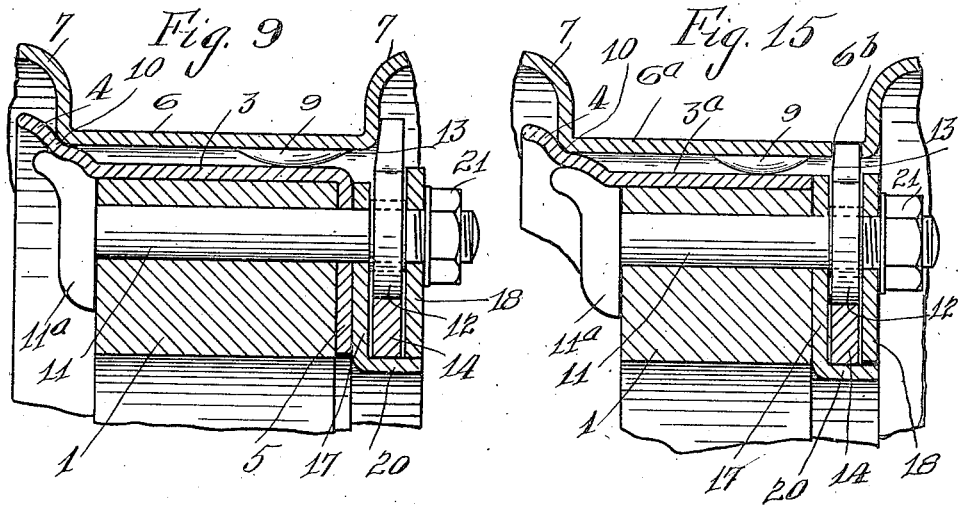
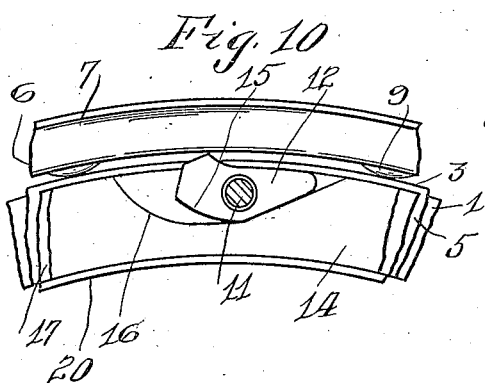
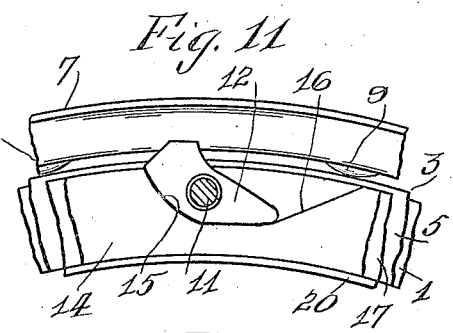
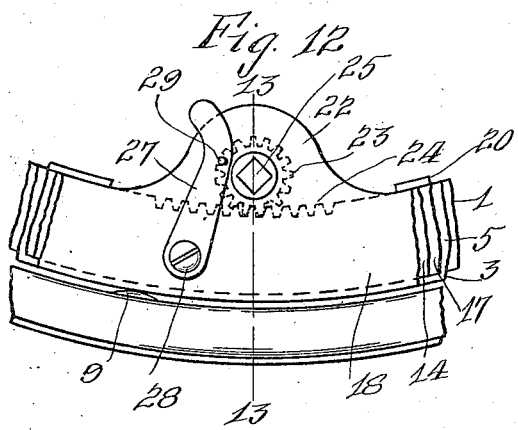
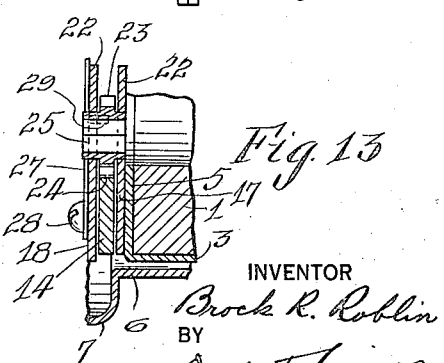

Patented Mar. 11, 1924.

1,486,456

UNITED STATES PATENT OFFICE.

BROCK R. ROBLIN, OF HOLLEY, NEW YORK, ASSIGNOR TO LIGHTNING CHANGE AUTO WHEEL CORPORATION, OF ROCHESTER, NEW YORK, A CORPORATION OF NEW YORK.

VEHICLE WHEEL.

Application filed March 25, 1921. Serial No. 455,283.

*To all whom it may concern:*

Be it known that I, BROCK R. ROBLIN, a citizen of the United States, and resident of Holley, in the county of Orleans and State of New York, have invented certain new and useful Improvements in Vehicle Wheels, of which the following is a specification.

The present invention relates to vehicle wheels and more particularly to the type having a fixed and a demountable rim, an object of this invention being to provide a simple and inexpensive mechanism which may be readily secured to a commercial automobile wheel for effecting a quick change of the demountable rim. A further object of the invention is to provide an improved locking means for a demountable rim which will effectively secure the said rim in place and may be quickly operated to effect a change of such rims.

To these and other ends, the invention consists of certain parts and combinations of parts all of which will be hereinafter described, the novel features being pointed out in the appended claims.

In the drawings:—

Fig. 1 is a plan view of a wheel constructed in accordance with this invention;

Fig. 2 shows a wheel with the tire and the outer retaining ring for the locking devices removed;

Fig. 3 is a side view of the outer retaining ring;

Fig. 4 is an edge view of said retaining ring;

Fig. 5 is a side view of the cam operating ring;

Fig. 6 is an edge view of the cam operating ring;

Fig. 7 is a fragmentary view of the inner ring;

Fig. 8 is a sectional view on the line 8—8, Fig. 7, through the inner ring;

Fig. 9 is a fragmentary sectional view on the line 9—9, Fig. 1;

Fig. 10 is a fragmentary view showing one of the locking devices in unlocking position;

Fig. 11 is a fragmentary view showing one of the locking devices in locking position;

Fig. 12 is a fragmentary view showing the locking devices for the operating ring;

Fig. 13 is a section on the line 13—13, Fig. 12;

Fig. 14 is a perspective view of a wrench or operating tool employed in connection with this invention; and Fig. 15 is a fragmentary sectional view through another embodiment of the invention.

Referring more particularly to the drawings, 1 indicates the wheel felloe connected to the spokes 2 and having a fixed rim 3 thereon, this rim being provided on one side with an outwardly extending flange 4 and at the other side with an inwardly extending flange 5 which cooperates with one face of the felloe 1. Arranged on the fixed rim is a demountable rim 6 which has outwardly extended side flanges 7 between which the tire 8 is received. This demountable rim has lugs 9 on its inner face cooperating with the fixed rim 3, and one side of the demountable rim rests in an annular depression 10 in the flange 4. The foregoing parts of the device are old and well known and no claim per se is made thereto. It is also old to provide bolts 11 which extend through the felloe of the wheel and have heads 11$^a$ which will engage the flange 7 of the rim to sustain the latter against the pressure thereon by the demountable rim 6, these bolts serving as supports for the fastening for the demountable rim.

According to this invention, a plurality of retaining or locking devices 12 is employed, each of these locking devices being, in this instance, pivotally mounted preferably by being arranged to turn on the bolts 11. Each locking device has, in this instance, a cam face 13 on one side for cooperating with one side of the demountable rim as shown in Fig. 9.

For effecting the simultaneous operation of these locking or retaining devices 12, there is provided an operating ring 14 in the form of a ring operating in the plane of operation of the locking devices and cooperating with such locking devices in such a manner that when the ring is rotated in one direction, the locking devices will be moved to locking position and when the ring is rotated in the opposite direction, the locking devices will be moved to unlocking position. This cooperation is effected by providing on each locking device a curved or cam face 15 and forming notches in the periphery of the ring 14 to provide cam faces 16 on the ring.

For supporting the cam ring 14, two rings 17 and 18 are provided, the former arranged on the inner side of the operating ring 14 and the latter arranged on the outer side of said operating ring. Both of these rings may be perforated at 19, in order that they may fit about the bolts 11. The ring 17 may have a curved or ring-shaped flange 20 at its inner periphery on which the operating ring is mounted to turn and about which the outer or retaining ring 18 fits. Nuts 21 on the bolts 11 secure the locking mechanism to the bolts 11.

The operation of the operating ring 14 may be effected in any suitable manner, but it is preferred to form inwardly extending lugs 22 on the rings 17 and 18, provide these lugs with aligned openings and arrange in these aligned openings the bearings of a gear wheel 23 which will mesh with teeth 24 formed on a portion of the inner periphery of the operating ring 14. The gear member 23 has a wrench socket 25 in which a wrench 26 is insertible for the purpose of turning the gear to effect the turning of the operating ring 14. The gear 23 may be held in any desired position by a locking pawl 27 formed of spring stock pivoted at 28 and having a pin 29 thereon insertible through an opening 30 in the ring 18 in order to engage between the teeth of the gear 23.

In the embodiment of the invention shown in Fig. 15, the rim 3ª does not have a flange cooperating with one side of the felloe and the retaining ring 17 engages directly with the felloe. The locking devices 12 instead of engaging with the side of the demountable rim 6ª engage within slots or openings 6ᵇ formed in the demountable rim 6ª. The other parts of this invention are substantially the same as those illustrated in the embodiment first described.

From the foregoing it will be seen that there has been provided a locking mechanism for demountable rims in which the operating ring has its plane of operation in the plane of operation of the locking or retaining devices, there being provided, between the operating ring and the locking devices, cam surfaces which effect the movement of the locking devices toward and from locking position. The locking devices are pivotally mounted on bolts which also serve to secure the operating mechanism for the locking devices to the vehicle wheel. The operating ring is arranged between two rings or plates secured by the bolts on which the locking devices turn, one of said plates having a bearing for the operating ring.

What I claim as my invention and desire to secure by Letters Patent is:

1. In combination with a vehicle wheel having a fixed rim and a demountable rim, pivoted locking devices mounted on the wheel to cooperate with the demountable rim and having cam faces, and a ring having its operating plane in the operating plane of the locking portions of said locking devices and having cam faces engaging the cam faces of the locking devices.

2. In combination with a vehicle wheel having a fixed rim and a demountable rim, pivoted locking devices mounted on said wheel to cooperate with said demountable rim and having cam faces, and a rotary ring operating in a plane with the plane of operation of said locking devices and formed with notches in its periphery having walls engaging the cam faces of the locking devices.

3. In combination with a vehicle wheel having a fixed rim and a demountable rim, bolts extending through the wheel, pivoted locking devices for the demountable rim mounted on said bolts, a ring secured to said bolts, and an operating ring for the locking devices mounted to turn on the first mentioned ring.

4. In combination with a vehicle wheel having a fixed rim and a demountable rim, bolts extending through the wheel, pivoted locking devices for the demountable rim mounted on said bolts, two rings mounted on said bolts and arranged on opposite sides of said locking devices, and operating means for the locking devices mounted between the rings.

5. In combination with a wheel having a fixed rim and a demountable rim, bolts extending through the wheel, locking devices mounted to turn on said bolts, two rings supported on said bolts on opposite sides of the locking devices, an operating ring arranged between the first two named rings, and cooperating with the locking devices to effect the movement of the latter, and a gear supported by the first two named rings and cooperating with said operating ring to effect the movement of said operating ring.

6. In combination with a wheel having a fixed rim and a demountable rim, bolts extending through the wheel, locking devices mounted to turn on said bolts, two rings supported on said bolts on opposite sides of the locking devices, an operating ring arranged between the first two named rings, and cooperating with the locking devices to effect the movement of the latter, a gear supported by the first two named rings and cooperating with said operating ring to effect the movement of said operating ring, and means for locking said gear against turning.

7. In combination with a vehicle wheel having a fixed rim and a demountable rim, bolts extending through said wheel, locking devices mounted to turn on said bolts, two rings mounted on the bolts and lying on opposite sides of the locking devices, one of said rings being provided with a curved bearing, and an operating ring for the locking devices mounted between the first two named rings and turning on said bearing.

8. In combination with a vehicle wheel having a fixed rim and a demountable rim, two rings detachably supported on said wheel at one side of the fixed rim, locking devices pivotally mounted between the rings, and an operating member for the locking devices arranged between the rings.

9. In combination with a vehicle wheel having a fixed rim and a demountable rim, two rings supported on said wheel, one of said rings having a curved bearing, locking devices pivotally mounted between the rings to cooperate with the demountable rim, and an operating ring mounted to turn on the curved bearing to operate the locking devices.

10. In combination with a vehicle wheel having a fixed rim and a demountable rim, two rings mounted on the wheel, movable locking devices for the demountable rim arranged between said rings, an operating ring for said locking devices arranged between the rings, and a gear supported by both rings and cooperating with the operating ring.

BROCK R. ROBLIN.